(12) United States Patent
Masuda et al.

(10) Patent No.: US 11,383,326 B2
(45) Date of Patent: Jul. 12, 2022

(54) HEAT EXCHANGER AND METHOD FOR MANUFACTURING SAME

(71) Applicants: IHI AEROSPACE CO., LTD., Tokyo (JP); Japan Aerospace Exploration Agency, Tokyo (JP)

(72) Inventors: Ideo Masuda, Ibaraki (JP); Toshiki Kato, Ibaraki (JP); Takuma Inoue, Tokyo (JP); Masahiro Sasaki, Tokyo (JP)

(73) Assignees: IHI AEROSPACE CO., LTD., Tokyo (JP); Japan Aerospace Exploration Agency, Tokyo (JP)

( * ) Notice: Subject to any disclaimer, the term of this patent is extended or adjusted under 35 U.S.C. 154(b) by 219 days.

(21) Appl. No.: 16/615,209

(22) PCT Filed: May 28, 2018

(86) PCT No.: PCT/JP2018/020293
§ 371 (c)(1),
(2) Date: Nov. 20, 2019

(87) PCT Pub. No.: WO2018/221437
PCT Pub. Date: Dec. 6, 2018

(65) Prior Publication Data
US 2020/0171604 A1    Jun. 4, 2020

(30) Foreign Application Priority Data
May 31, 2017 (JP) .............................. JP2017/107635

(51) Int. Cl.
B23K 26/342 (2014.01)
F02K 9/64 (2006.01)
(Continued)

(52) U.S. Cl.
CPC .............. *B23K 26/342* (2015.10); *F02K 9/64* (2013.01); *F28D 7/10* (2013.01); *F28F 21/085* (2013.01);
(Continued)

(58) Field of Classification Search
CPC ..... B23K 26/342; B23K 2101/14; F02K 9/64; F28D 7/10; F28F 21/085; F05D 2230/31
(Continued)

(56) References Cited

U.S. PATENT DOCUMENTS

2018/0281064 A1* 10/2018 Takahashi ............... C23C 28/00
2019/0329355 A1* 10/2019 Gradl ................. B23K 15/0093

FOREIGN PATENT DOCUMENTS

DE  10 2015 212 284 A1   1/2017
JP       4-319084 A     11/1992
(Continued)

OTHER PUBLICATIONS

International Search Report issued in corresponding application PCT/JP2018/020293, completed Jul. 12, 2018 and dated Aug. 14, 2018.
(Continued)

*Primary Examiner* — Justin M Jonaitis
(74) *Attorney, Agent, or Firm* — Merchant & Gould P.C.

(57) ABSTRACT

A heat transfer body 3 is prepared. The heat transfer body 3 forms an inner space 7 for existence of one of a higher-temperature fluid or a lower-temperature fluid. The heat transfer body 3 constitutes a heat exchanger, and is formed of a copper material as a wall surrounding the inner space 7. In the wall, a flow path through which the other of the higher-temperature fluid and the lower-temperature fluid flows is formed. By LMD treatment, an LMD layer is formed directly on an outer circumferential surface 3a of the heat transfer body 3. In the LMD treatment, a metal material
(Continued)

is supplied to a supply position on the outer circumferential surface 3a, and the supply position is irradiated with laser light to form an LMD layer 5. An energy density of the laser light is set to melt both the metal material and the outer circumferential surface 3a.

7 Claims, 6 Drawing Sheets

(51) Int. Cl.
  *F28D 7/10* (2006.01)
  *F28F 21/08* (2006.01)
  *B23K 101/14* (2006.01)
(52) U.S. Cl.
  CPC ...... *B23K 2101/14* (2018.08); *F05D 2230/31* (2013.01)
(58) Field of Classification Search
  USPC .......................................................... 165/154
  See application file for complete search history.

(56) References Cited

FOREIGN PATENT DOCUMENTS

| | | |
|---|---|---|
| JP | 2011-147947 A | 8/2011 |
| JP | 5823069 B1 | 11/2015 |
| JP | 2016-135905 A | 7/2016 |
| JP | 2017-025720 A | 2/2017 |
| WO | 2016/117202 A1 | 7/2016 |

OTHER PUBLICATIONS

Office Action issued in corresponding Japanese Patent Application 2017-107635 dated Sep. 15, 2020.
Extended European Search issued in corresponding application 18810397.2, completed May 12, 2020 and dated May 26, 2020.
Office Action issued in corresponding Japanese Patent Application 2017-107635 completed on Mar. 26, 2021 and dated Mar. 30, 2021, with English translation.
Office Action for European Patent Application No. 18810397.2 dated Sep. 8, 2021, 5 pages.

* cited by examiner

HEAT EXCHANGER AND METHOD FOR MANUFACTURING SAME

This is a National Phase Application in the United States of International Patent Application No. PCT/JP2018/020293 filed May 28, 2018, which claims priority on Japanese Patent Application No. 2017/107635, filed May 31, 2017. The entire disclosures of the above patent applications are hereby incorporated by reference.

TECHNICAL FIELD

The present invention relates to a heat exchanger for cooling heat from a higher-temperature fluid, with a lower-temperature fluid.

BACKGROUND ART

A heat exchanger is used in a rocket engine, for example. The rocket engine includes a combustor and a nozzle. The combustor internally includes a combustion chamber that combusts fuel and thereby generates a combustion gas. The nozzle jets, to an outside, the combustion gas generated in the combustion chamber, and thereby generates thrust of the rocket.

The combustor of the rocket engine is configured as a heat exchanger so as not to be damaged by heat of the combustion gas. In other words, cooling flow paths are formed in the combustor in which a cooling medium for cooling heat from the combustion gas flows through the cooling flow paths. Such a combustor of the rocket engine is described in PTL 1, for example.

In PTL 1, a combustor includes an inner cylinder surrounding a combustion chamber and formed of copper, an outer layer formed on an outer circumferential surface of the inner cylinder, and an LMD layer formed on an outer circumferential surface of the outer layer. On the outer circumferential surface of the inner cylinder, a plurality of grooves extending in an axial direction of the inner cylinder are formed at intervals in a circumferential direction thereof. These grooves become the above-described cooling flow paths by being covered with the outer layer. The outer layer includes a copper layer formed on the outer circumferential surface of the inner cylinder, and a nickel layer formed on the copper layer. The LMD layer is formed on the nickel layer by laser metal deposition (LMD: laser metal-powder building-up welding) treatment. In the LMD treatment, powder of a nickel-based alloy is melted by laser light and is bonded to the nickel layer. Thereby, the LMD layer made of the nickel-based alloy is formed. The LMD layer is provided for suppressing deformation of the inner cylinder and the outer layer.

As described in PTL 1, copper has high reflectivity of laser light, and thus, it is considered to be difficult to perform the LMD treatment directly on a copper layer. For this reason, in PTL 1, without performing the LMD treatment directly on the copper layer, as described above, the nickel layer having reflectivity of laser light lower than that of the copper layer is provided, and the LMD treatment is performed on the nickel layer.

CITATION LIST

Patent Literature

PTL 1: Japanese Patent No. 5823069

SUMMARY OF INVENTION

Technical Problem

However, when a combustor of a rocket engine is constituted by a heat transfer body (e.g., a structure including the above-mentioned inner cylinder and outer layer) that is made of copper, and by an LMD layer that reinforces the heat transfer body, it is desired to omit a step of providing the above-described nickel layer, in order to reduce the cost.

Further, even in the case of a combustor other than that of a rocket engine, when the combustor for cooling, with a lower-temperature fluid, heat from a higher-temperature fluid is constituted by a heat transfer body that is made of copper and an LMD layer that reinforces the heat transfer body, it is desired to omit a step of providing a nickel layer as described above between the heat transfer body and the LMD layer.

Solution to Problem

In view of the above, an object of the present invention is to provide a technique of eliminating necessity of forming, between a LMD layer and a heat transfer body, a layer (e.g., a nickel layer) of a material whose reflectivity of laser light is lower than that of copper when the LMD layer is formed on an outer circumferential surface of the heat transfer body made of copper in a heat exchanger for cooling heat from a higher-temperature fluid, with a lower-temperature fluid.

Solution to Problem

In order to solve the above-described object, a method according to the present invention is a method for manufacturing a heat exchanger for cooling heat from a higher-temperature fluid, with a lower-temperature fluid whose temperature is lower than that of the higher-temperature fluid, the method including:

(A) preparing a heat transfer body that forms an inner space where one of the higher-temperature fluid and the lower-temperature fluid is to exist, wherein the heat transfer body is a constituent element of the heat exchanger and is formed, as a wall surrounding the inner space, of a material including pure copper or a copper alloy, and in the wall, a flow path through which the other of the higher-temperature fluid and the lower-temperature fluid is made to flow is formed; and (B) forming an LMD layer directly on an outer circumferential surface of the heat transfer body by laser metal deposition (LMD: laser metal-powder building-up welding) treatment, wherein the LMD treatment includes: supplying a metal material to a supply position on the outer circumferential surface of the heat transfer body; and irradiating the supply position with laser light, and thereby, the LMD treatment melts both the metal material and the outer circumferential surface formed of the material including the pure copper or the copper alloy, and forms the LMD layer of the metal material, and the method includes setting an energy density of the laser light to be a height that melts both the metal material and the outer circumferential surface.

A heat exchanger according to the present invention is a heat exchanger for cooling heat from a higher-temperature fluid, with a lower-temperature fluid whose temperature is lower than that of the higher-temperature fluid, wherein the heat exchanger includes a heat transfer body that forms an inner space for existence of one of the higher-temperature fluid and the lower-temperature fluid, the heat transfer body is formed, as a wall surrounding the inner space, of a material including pure copper or a copper alloy, and in the wall, a flow path through which the other of the higher-temperature fluid and the lower-temperature fluid is made to flow is formed, and the heat exchanger includes a laser metal deposition (LMD: laser metal-powder building-up welding) layer formed directly on an outer circumferential surface of the heat transfer body.

Advantageous Effect of Invention

According to the present invention, in the LMD treatment, an energy density of the laser light is set to be a height that melts both the metal material of the LMD layer and a material of the heat transfer body including pure copper or a copper alloy. Thereby, the LMD layer can be formed directly on the outer circumferential surface of the material including pure copper or a copper alloy in the heat transfer body such that a bond strength between the heat transfer body and the LMD layer is sufficiently high. Therefore, it is possible to omit a step of forming, on the outer circumferential surface of the heat transfer body, a layer of a material whose reflectivity of laser light is lower than that of the material including pure copper or a copper alloy.

DESCRIPTION OF EMBODIMENTS

An embodiment of the present invention is described based on the drawings. Note that the parts common to the respective drawings are denoted by the same reference symbols, and the overlapping description is omitted.

(Structure of Heat Exchanger)

Figure 1A:
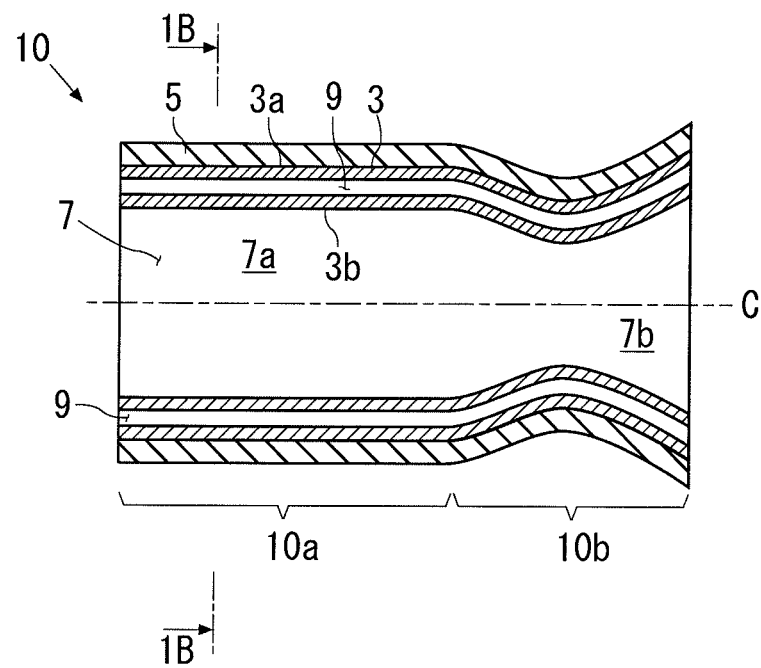
FIG. 1A illustrates a structure of a heat exchanger according to an embodiment of the present invention.
Figure 1B:
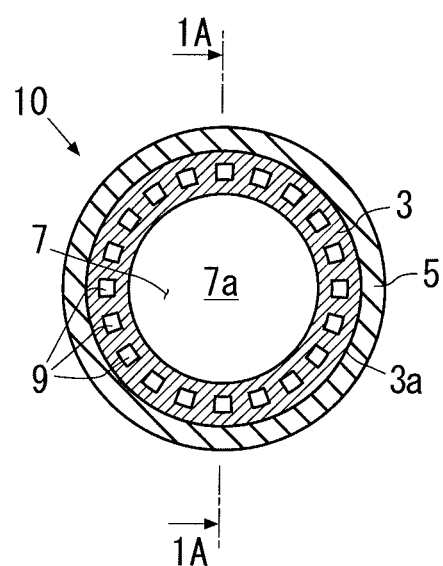
FIG. 1B is a cross-sectional view taken along the line 1B-1B in FIG. 1A.

FIG. 1A illustrates a structure of a heat exchanger 10 according to an embodiment of the present invention. FIG. 1B is a cross-sectional view taken along the line 1B-1B in FIG. 1A. Note that FIG. 1A is a cross-sectional view taken along the line 1A-1A in FIG. 1B. The heat exchanger 10 is used for cooling heat from a higher-temperature fluid, with a lower-temperature fluid whose temperature is lower than that of the higher-temperature fluid. The heat exchanger 10 includes a heat transfer body 3 and a laser metal deposition (LMD: laser metal-powder welding) layer 5.

The heat transfer body 3 includes an inner space 7 in which one of the higher-temperature fluid and the lower-temperature fluid exists. For example, the higher-temperature fluid is generated or flows in the inner space 7. The higher-temperature fluid is a gas such as a combustion gas or steam, for example, but may be a liquid. The heat transfer body 3 is formed as a wall surrounding the inner space 7, and a flow path 9 is formed in the wall. The heat transfer body 3 may be formed in a cylindrical shape including the inner space 7 as illustrated in FIG. 1A and FIG. 1B. The heat transfer body 3 is entirely formed of pure copper or a copper alloy (a copper alloy including copper as a main component). Accordingly, an outer circumferential surface 3a of the heat transfer body 3 is also formed of a material including pure copper or a copper alloy. In the following, "copper material" means a material including pure copper or a copper alloy. The material (i.e., "copper material" in the following) including pure copper or a copper alloy may be pure copper or a copper alloy.

In the example of FIG. 1A, the heat exchanger 10 forms a combustor 10a of a rocket engine. However, the heat exchanger 10 may be used as another heat exchanger used in the industry. For example, the heat exchanger 10 may be used as a steam generator or a condenser, or may be used in a ship or a car.

When the heat exchanger 10 forms the combustor 10a of the rocket engine, the heat transfer body 3 is cylindrical, and the inner space 7 of the heat transfer body 3 includes a combustion chamber 7a of the combustor 10a of the rocket engine. The combustion chamber 7a is a space area where a liquid fuel or a solid fuel is combusted, and a combustion gas is thereby generated as the above-described higher-temperature fluid. The rocket engine includes a nozzle 10b in addition to the combustor 10a.

The nozzle 10b jets the combustion gas generated in the combustion chamber 7a to an outside, and thereby generates a thrust of the rocket. In FIG. 1A, the heat exchanger 10 forms not only the combustor 10a but also the nozzle 10b of the rocket engine. In other words, in FIG. 1A, the combustor 10a and the nozzle 10b are integrally formed. However, the combustor 10a and the nozzle may be separately manufactured and then coupled to each other. In other words, the heat exchanger 10 forms the combustor 10a, but does not need to form the nozzle. Note that in FIG. 1A, the inner space 7 of the heat transfer body 3 includes the combustion chamber 7a and the flow path 7b of the nozzle 10b into which the combustion gas flows from the combustion chamber 7a.

In the flow path 9, the other of the higher-temperature fluid and the lower-temperature fluid flows. The flow path 9 extends in a direction along an axis C and an inner circumferential surface 3b of the heat transfer body 3 in the example of FIG. 1A, and a plurality of the flow paths 9 are formed at intervals in the circumferential direction. In FIG. 1A, the flow path 9 may be a flow path in which a liquid fuel flows from the right side to the left side in this drawing. In this case, after flowing through the flow paths 9, the liquid fuel is introduced into the combustion chamber 7a (by an un-illustrated pipe for example), is combusted, and is thereby turned into a combustion gas. The combustion gas exchanges heat with the liquid fuel flowing through the flow paths 9. This heat exchange raises a temperature of the liquid fuel, and thus, the liquid fuel is introduced into the combustion chamber 7a in an easily combustible state.

The LMD layer 5 is formed directly on the outer circumferential surface 3a of the heat transfer body 3 by LMD treatment. The LMD layer 5 has a function of suppressing deformation of the heat transfer body 3 due to one or both of heat and pressure of the higher-temperature fluid. In other words, the LMD layer 5 has a strength higher than that of the copper material forming the heat transfer body 3. In addition, the LMD layer 5 may further have a function of suppressing deformation of the heat transfer body 3 due to pressure of the cooling medium (lower-temperature fluid) flowing through the flow paths 9. The LMD layer 5 is formed of a metal material that achieves such functions. The metal material may be a nickel-based alloy including nickel as a main component. For example, the metal material may be Inconel (registered trademark).

A tensile strength at the bonded portion between the heat transfer body 3 and the LMD layer 5 is larger than that of the heat transfer body 3 itself (i.e., the copper material itself forming the heat transfer body 3).

When the metal material forming the LMD layer 5 is a nickel-based alloy, a density of nickel is uniform throughout the entire LMD layer 5 in one example.

Meanwhile, it is assumed that a low-reflectivity layer (e.g., pure nickel) having reflectivity of a laser light lower than that of the outer circumferential surface 3a of the heat transfer body 3 is formed on the outer circumferential surface 3a of the heat transfer body 3 so as to be thin as in PTL 1, and on an outer circumferential surface of this layer, an LMD layer of a nickel-based alloy including a predetermined weight percentage of nickel is formed. In this case, when the low-reflectivity layer is melted and integrated with the LMD layer by heat of laser light at the time of LMD treatment, the low-reflectivity layer and the nickel-based alloy have densities of nickel that are different from each other, and for this reason, a density of nickel differs between a portion of the low-reflectivity layer and a portion of the nickel-based alloy. Thus, in the LMD layer including the low-reflectivity layer and the nickel-based alloy, a density of nickel that is near the outer circumferential surface 3a and that is in the LMD layer formed in accordance with PTL 1 differs from that in the case of the LMD layer 5 formed directly on the outer circumferential surface 3a in the present embodiment. According to the present embodiment, the first LMD sublayer 5a described below is mixed with the copper material of the outer circumferential surface 3a, but an outer circumferential portion of the first LMD sublayer 5a is not mixed with the copper material of the outer circumferential surface 3a, is a portion of the below-described metal material (e.g., Inconel (registered trademark)), and has a density of a main component (e.g., nickel) of the metal material that is substantially the same as a density of the second LMD sublayer 5b described below. In other words, according to the present embodiment, in the LMD layer 5, a density of the main component (e.g., nickel) of the metal material is uniform throughout the entire LMD layer 5 except for the portion mixed with the copper material of the outer circumferential surface 3a.

(Method for Manufacturing Heat Exchanger)

Figure 2:
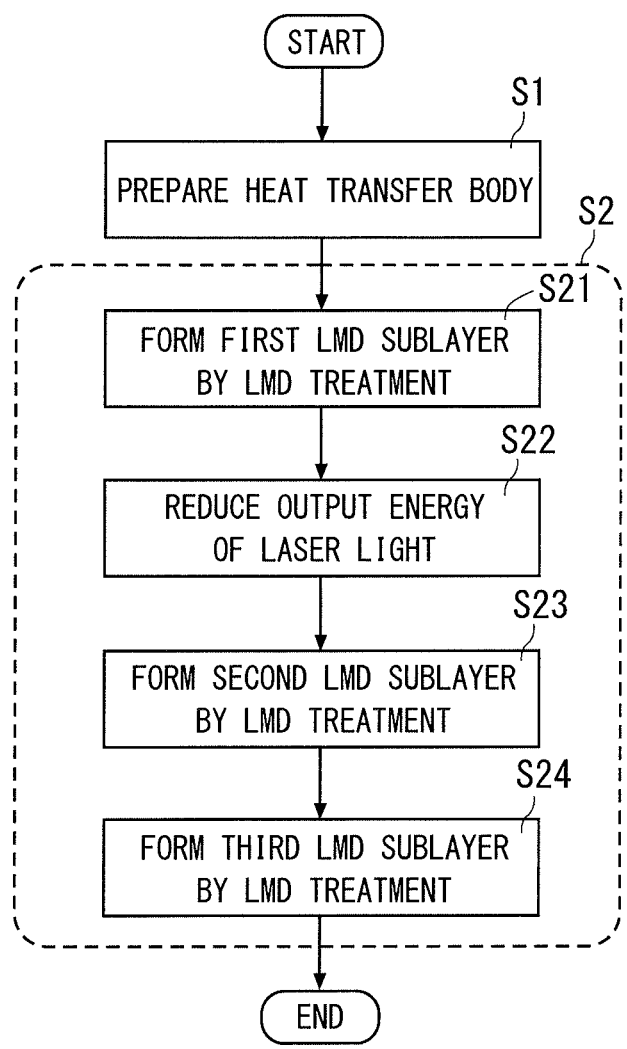
FIG. 2 is a flowchart illustrating a method for manufacturing the heat exchanger according to the embodiment of the present invention.

FIG. 2 is a flowchart illustrating a method for manufacturing the heat exchanger 10 according to the embodiment of the present invention. FIG. 3A to FIG. 3D are illustrations of this manufacturing method. The method for manufacturing the heat exchanger 10 includes a step S1 and a step S2.

Figure 3A:
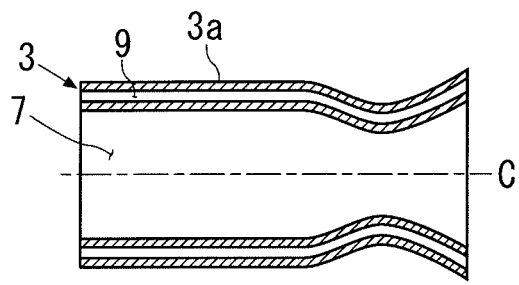
FIGS. 3A to 3D are illustrations of the method for manufacturing the heat exchanger according to the embodiment of the present invention.

At the step S1, the above-described heat transfer body 3 is prepared. For example, the heat transfer body 3 illustrated in FIG. 3A is prepared.

The heat transfer body 3 prepared at the step S1 may include an inner cylinder formed of the copper material and including an outer circumferential surface in which a plurality of grooves are formed. The heat transfer body 3 may include an outer layer of the copper material formed on the outer circumferential surface of the inner cylinder. In this case, a plurality of the grooves constitutes the flow paths 9 by being covered with the outer layer. Note that the inner cylinder may be formed by machining a forged material, and the outer layer of the copper material may be formed by electroforming or another method.

Alternatively, the heat transfer body 3 prepared at the step S1 may be integrally formed such that the flow paths 9 are formed in a wall thereof. In this case, the heat transfer body 3 may be formed by a three-dimensional (3D) printer, for example. In this case, the heat transfer body 3 may be formed entirely of a material having the same physical properties (e.g., a strength, thermal conductivity, a dielectric constant, and the like). In other words, the heat transfer body 3 may have the same physical properties throughout entirety thereof.

At the step S2, the LMD layer 5 is formed directly on the outer circumferential surface 3a of the heat transfer body 3 prepared at the step S1. The LMD layer 5 is formed by LMD treatment. The step S2 is performed by an LMD device 11. The configuration of the LMD device 11 may be the same as that of the LMD device described in PTL 1 except for energy of output laser light.

Figure 3B:
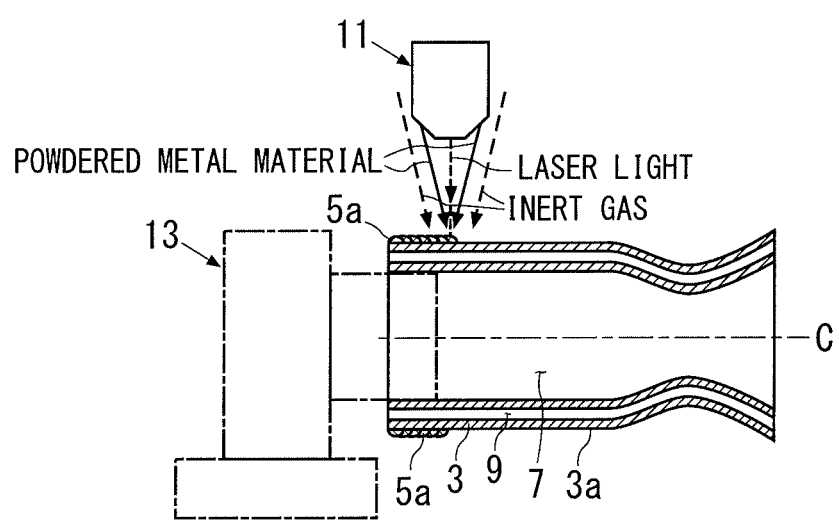

In this LMD treatment, as illustrated in FIG. 3B, the LMD device 11 supplies a powdered metal material (metal powder) to a supply position on the outer circumferential surface 3a of the heat transfer body 3, and this supply position is irradiated with the laser light. Thereby, both the outer circumferential surface 3a of the heat transfer body 3 and the metal material are melted, and the LMD layer 5 (in FIG. 3B, the first LMD sublayer 5a described below) of the metal material is formed so as to be bonded to the outer circumferential surface 3a. At this time, an energy density of the laser light at the supply position on the outer circumferential surface 3a is set to be a height that melts both the outer circumferential surface 3a of the heat transfer body 3 and the metal material. In the present embodiment, the metal material used at the step S2 may be a nickel-based alloy. Hereinafter, a supply position means a position to which the metal material is supplied and that is irradiated with the laser.

Further, the LMD device 11 supplies an inert gas (e.g., an argon gas) so as to surround the supply position of the outer circumferential surface 3a, and thereby shields the supply position from the surrounding air by the inert gas, preventing oxidation of the outer circumferential surface 3a and the metal material at the supply position.

In the LMD treatment at the step S2, the LMD layer 5 is formed in a target area (e.g., the entire outer circumferential surface 3a) on the outer circumferential surface 3a by shifting the supply position. In other words, while the supply position is shifted, the LMD layer 5 is formed throughout the target area by supplying the metal material to the supply position and irradiating the supply position with the laser light. A direction (hereinafter, also referred to simply as the shifting direction) of this shifting is the circumferential direction of the heat transfer body 3 (e.g., a helical direction around the axis C of the heat transfer body 3) in the example of FIG. 3B, but may be a direction along the axis C of the heat transfer body 3. When the shifting direction is the circumferential direction of the heat transfer body 3, the LMD device 11 is gradually moved in a direction along the axis C of the heat transfer body 3 while a holding device 13 (illustrated by the one dotted chain line in FIG. 3B) holds the heat transfer body 3, and rotates the heat transfer body 3 around the axis C. When the shifting direction is the direction along the axis C, for example, the LMD device 11 is moved from one axial-direction end to the other axial-direction end of the heat transfer body 3, and then, is slightly moved in the circumferential direction of the heat transfer body 3, and is moved from the other axial-direction end to the one axial-direction end of the heat transfer body 3, and such operation is repeated.

The step S2 includes steps S21 to S24.

At the step S21, as illustrated in FIG. 3B, the LMD device 11 supplies the metal material to the supply position on the outer circumferential surface 3a of the heat transfer body 3, and irradiates this supply position with the laser light. Thereby, both the outer circumferential surface 3a and the metal material are melted, and the first LMD sublayer 5a of the metal material bonded to the outer circumferential surface 3a is formed. In other words, by shifting the supply position, the first LMD sublayer 5a is formed throughout the target area. Note that an outer circumferential portion of the first LMD sublayer 5a is not mixed with the copper material of the outer circumferential surface 3a. In other words, a metal material (powder) is put into a pond of the melted heat transfer body 3, and this metal material is also melted and mixed with the pond, but a layer of only the metal material is formed at a portion on an outer side of this mixed portion.

At the step S22, output energy (energy per unit time (e.g., unit is watt)) of the laser light used in the LMD treatment is reduced. As a result, at the next steps S23 and S24, the energy density of the laser light at the supply position becomes lower than that in the case of the above-described step S21 (e.g., becomes equal to or lower than half of the energy density in the case of the step S21). In other words, at the steps S23 and S24, it is sufficient to melt the outer circumferential surfaces of the first and second LMD sublayers 5a and 5b whose reflectivity of laser light is lower than that of the outer circumferential surface 3a of the heat transfer body 3, and for this reason, the energy density of laser light is reduced.

Note that the energy density at the supply position may be reduced at the step S22 by expanding a spot diameter of the laser light at the supply position, in addition to or instead of reducing the output energy of the laser light.

Figure 3C:
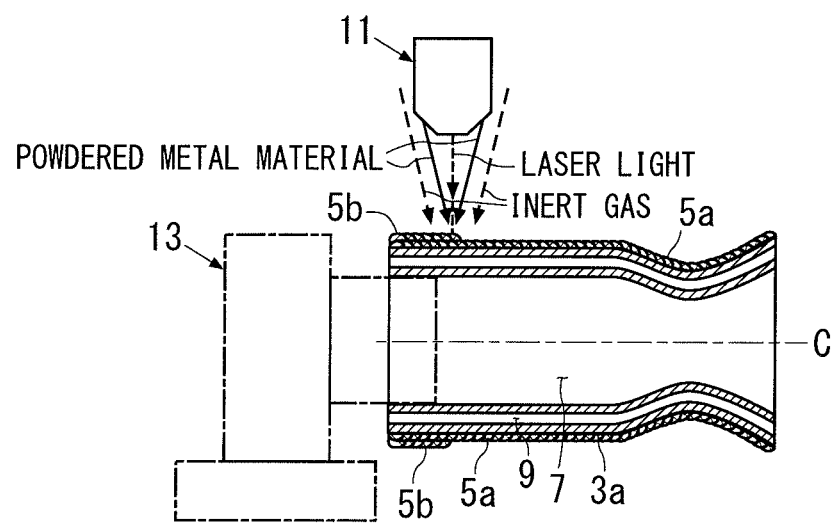

At the step S23, as illustrated in FIG. 3C, the LMD device 11 supplies the metal material to the supply position on the outer circumferential surface of the first LMD sublayer 5a, and irradiates this supply position with the laser light. Thereby, both this outer circumferential surface and the metal material are melted, and the second LMD sublayer 5b of the metal material bonded to this outer circumferential surface is formed. In other words, by shifting the supply position, the second LMD sublayer 5b is formed throughout the target area.

Figure 3D:
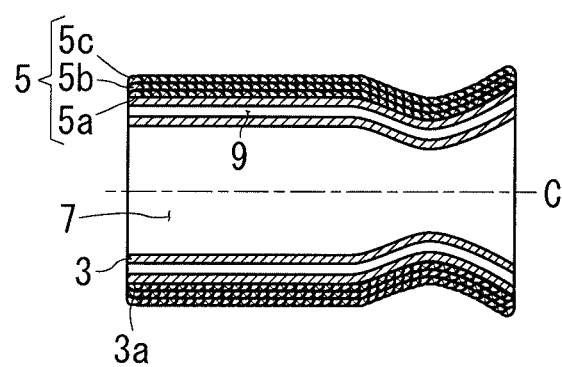

At the step S24, the LMD device 11 supplies the metal material to the supply position on an outer circumferential surface of the second LMD sublayer 5b, and irradiates this supply position with the laser light. Thereby, both this outer circumferential surface and the metal material are melted, and a third LMD sublayer 5c of the metal material bonded to this outer circumferential surface is formed. In other words, by shifting this supply position, as illustrated in FIG. 3D, the third LMD sublayer 5c is formed in the target area.

In the present embodiment, as long as deformation of the heat transfer body 3 can be suppressed as described above, the number of LMD sublayers constituting the LMD layer 5 is not limited to three of the first to third LMD sublayers 5a to 5c, and may be one, two, or four or more. Further, metal materials for forming respective LMD sublayers (the LMD sublayers 5a to 5c in the above description) may be the same.

<Positional Relation Between Adjacent Beads in LMD Treatment>

Figure 4A:
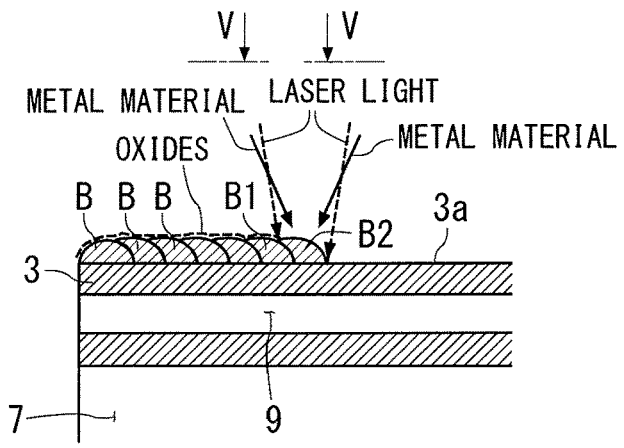
FIGS. 4A to 4C are illustrations of a positional relation between adjacent beads in LMD treatment.
Figure 4B:
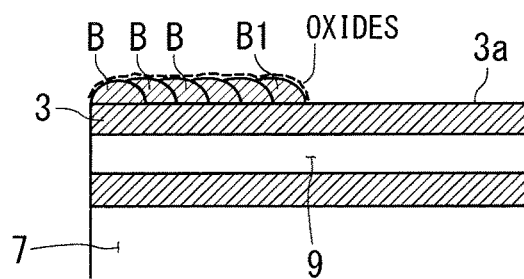

FIG. 4A is a partial enlarged view of FIG. 3B. By shifting the supply position as described above, as illustrated in FIG. 4A and FIG. 5, beads B, B1 and B2 that are weld metals of the metal material are formed so as to extend along a line in the shifting direction (the circumferential direction in FIG. 3B and FIG. 4A), and the LMD layer 5 is formed by the beads B, B1, and B2. FIG. 4A illustrates a state where after the respective beads B are formed, the preceding bead B1 and the next bead B2 are formed in this order. Note that the respective beads B, B1, and B2 may form one bead that extends continuously (e.g., helically). FIG. 4B is a diagram corresponding to FIG. 4A, and illustrates a state where the preceding bead B1 is formed, but the next bead B2 is not formed yet.

Figure 5:
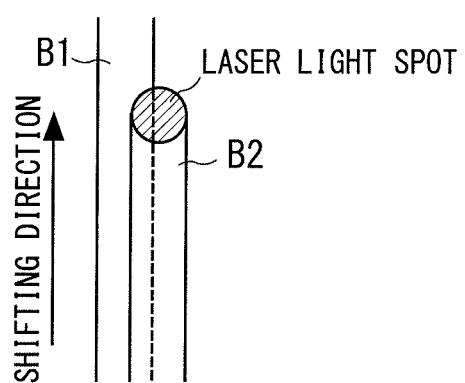
FIG. 5 is a view taken along the line V-V in FIG. 4A, and illustrates a positional relation between a preceding bead and a next bead.

FIG. 5 corresponds to a view taken in the direction of the V-V arrow in FIG. 4A, and is a diagram in which the preceding bead B1 and the next bead B2 in FIG. 4A are expanded in the shifting direction. The hatched portion in FIG. 5 indicates a laser light spot that is an irradiation area of the laser light to the supply position.

As illustrated in FIG. 4A and FIG. 5, when the next bead B2 adjacent to the already-formed preceding bead B1 in the direction along the outer circumferential surface 3a is formed, the next bead B2 is formed such that the preceding bead B1 is partially covered with the next bead B2. In this manner, a part of an outer surface of the preceding bead B1 (e.g., one fourth or more and two thirds or less, one third or more and two thirds or less, or one third or more and half or less of the outer surface) is covered with the next bead B2. In other words, a part of the outer surface of the preceding bead B1 (e.g., one fourth or more and two thirds or less, one third or more and two thirds or less, or one third or more and half or less of the outer surface) is irradiated with the laser light for forming the next bead B2 and is melted, and the preceding bead B1 and the next bead B2 are bonded to (integrated with) each other. When the next bead B2 is formed, the next bead B2 becomes the preceding bead, and on this preceding bead B2, a next bead is formed in the same manner as described above. This is repeated from the start time to the end time of the step S2.

Thereby, oxides can be prevented from remaining between the first bead B1 and the next bead B2. The beads B, B1 and B2 are made to be outside the area of the above-described inert gas, and then contact with air, thereby causing oxides to be formed on outer surfaces of the beads B, B1 and B2. In FIG. 4A and FIG. 4B, the oxides are illustrated by the broken lines. The oxide at a portion that is included in the outer surface of the preceding bead B1 and that is covered with the next bead B2 is melted by heat of the laser light at the time of forming the next bead B2, and is thereby fused into the LMD layer 5 or is repositioned on an outer surface of the LMD layer 5 (the outer surface of the sublayer 5a, 5b or 5c formed by this bead). As a result, the oxides are prevented from remaining between the beads adjacent to each other, and cracks due to the oxides are prevented from occurring. For example, in FIG. 4A and FIG. 4B, the oxides illustrated by the broken lines do not exist between the beads B, B1, and B2 adjacent to each other.

Figure 4C:
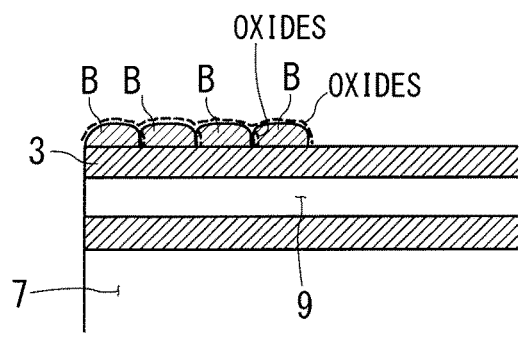

Meanwhile, as illustrated in FIG. 4C, when the preceding bead is not partially covered with the next bead, oxides illustrated by the broken lines in this drawing tends to remain between beads B adjacent to each other.

Note that the boundaries between the beads B, B1, and B2 adjacent to each other are depicted in FIG. 4A to FIG. 4C for the purpose of clarification, but no boundaries exist between the beads adjacent to each other in reality, and the beads are fused with and integrated with each other. Further, as illustrated in FIG. 5, a width of the bead is determined by the spot diameter of the laser light at the supply position, and the laser light for forming the next bead B2 is applied to substantially the same position as a formation location of this bead B2. The oxide on the outer circumferential surface of the first LMD sublayer 5a at a stage where formation of the first LMD sublayer 5a is finished is melted by the laser light at the time of forming the second LMD sublayer 5b, and is thereby fused into the LMD layer 5 or repositioned on the outer surface of the LMD layer 5.

<Energy Density of Laser Light>

The following table 1 represents experimental data indicating conditions and results regarding the step S21 in the above-described manufacturing method.

TABLE 1

| | UNIT | | | | VALUE | | | |
|---|---|---|---|---|---|---|---|---|
| LASER DENSITY | W/mm$^2$ | 417 | 424 | 439 | 453 | 467 | 481 | 495 |
| MATERIAL INCIDENT ENERGY | W/(g/min) | 359 | 365 | 378 | 390 | 402 | 414 | 426 |
| BONDED STATE | | UNFIT | ALLOWED | ALLOWED | ALLOWED | FINE | FINE | OPTIMUM |

The respective terms in the table 1 are as follows. The term "LASER DENSITY" is an energy density of the laser light at the supply position. The term "MATERIAL INCIDENT ENERGY" is output energy of the laser light per unit mass of the metal material (nickel-based alloy) supplied to the supply position per unit time.

The term "BONDED STATE" means a bonded state between the LMD layer 5 formed at the above-described step S21 and the outer circumferential surface 3a of the heat transfer body 3. Concerning the bonded state, the term "UNFIT" indicates that a degree of penetration of the LMD layer 5 into the heat transfer body 3 is shallow, and in the LMD layer 5, partial peeling occurs due to internal stress. The term "ALLOWED" indicates that a degree of penetration of the LMD layer 5 into the heat transfer body 3 is shallow, but a bond strength between the outer circumferential surface 3a and the LMD layer 5 can be expected to be appropriate. The term "FINE" indicates that a degree of penetration of the LMD layer 5 into the heat transfer body 3 is appropriate, and a bond strength between the outer circumferential surface 3a and the LMD layer 5 can be expected to be sufficient. The term "OPTIMUM" indicates that it has been confirmed that a degree of penetration of the LMD layer 5 into the heat transfer body 3 is sufficient, and a tensile strength of the bonded portion between the outer circumferential surface 3a and the LMD layer 5 is higher than a tensile strength of the copper material (in this example, a copper alloy) itself of the heat transfer body 3.

Considering the experimental data in the table 1, an energy density of the laser light applied to the supply position on the outer circumferential surface 3a of the heat transfer body 3 at the above-described step S21 may be, at the supply position, equal to or larger than 420 W/mm$^2$ (e.g., equal to or larger than 424 W/mm$^2$), equal to or larger than 460 W/mm$^2$ (e.g., equal to or larger than 467 W/mm$^2$), or equal to or larger than 490 W/mm$^2$ (e.g., equal to or larger than 495 W/mm$^2$). The upper limit of the energy density may be approximately 500 W/mm$^2$ or 600 W/mm$^2$, but is not limited thereto.

Further, considering the experimental data in the table 1, output energy of the laser light per unit mass of the metal material (nickel-based alloy) supplied to the supply position per unit time at the above-described step S21 is equal to or larger than 360 W/(g/min) (e.g., equal to or larger than 365 W/(g/min)), equal to or larger than 400 W/(g/min) (e.g., equal to or larger than 402 W/(g/min)), or equal to or larger than 420 W/(g/min) (e.g., equal to or larger than 426 W/(g/min)). However, as long as the metal material can be sufficiently melted, the output energy of the laser light is not limited to these ranges, and can be set appropriately.

The following table 2 represents experimental data indicating conditions and a result regarding the steps S23 and S24 in the above-described manufacturing method.

TABLE 2

| | UNIT | VALUE |
|---|---|---|
| LASER DENSITY | W/mm$^2$ | 176 |
| MATERIAL INCIDENT ENERGY | W/(g/min) | 140 |
| BONDED STATE | | FINE |

In the table 2, the term "FINE" in the "BONDED STATE" indicates that the second and third LMD sublayer 5b and 5c are satisfactorily bonded integrally to the lower-side LMD sublayers 5a and 5b. Each of the terms in the table 2 is the same as that in the table 1.

Considering the experimental data in the table 2, a energy density of the laser light applied to the supply position at the above-described steps S23 and S24 is equal to or larger than 175 W/mm$^2$ (e.g., equal to or larger than 176 W/mm$^2$) at the supply position in one example, but is not limited to this as long as the metal material can be melted and bonded integrally to the lower-side LMD sublayers.

Further, considering the experimental data in the table 2, output energy of the laser light per unit mass of the metal material (nickel-based alloy) supplied to the supply position per unit time at the above-described steps S23 and S24 may be equal to or larger than 140 W/(g/min). However, as long as the metal material can be sufficiently melted, energy of the laser light is not limited to this range, and can be set appropriately.

(Advantageous Effect of the Embodiment)

In the LMD treatment, an energy density of the laser light is set to be a height that can melt both the copper material forming the outer circumferential surface 3a of the heat transfer body 3 and the metal material of the LMD layer 5. Thereby, the LMD layer 5 can be formed directly on the outer circumferential surface 3a of the copper material in the heat transfer body 3, in a state where a bond strength between the heat transfer body 3 and the LMD layer 5 is sufficiently high. For this reason, it is possible to omit a step of forming, on the outer circumferential surface 3a of the heat transfer body 3, a layer of a material whose reflectivity of the laser light is lower than that of the copper material.

As described above, the next bead B2 is formed such that the preceding bead B1 is partially covered with the next bead B2, and thus, oxides that are included in oxides generated on the outer surface of the preceding bead B1 and that are positioned between the preceding bead B1 and the next bead B2 can be melted by the laser light at the time of forming the next bead B2, and be thereby fused into the LMD layer 5 or be repositioned on the outer surface of the LMD layer 5 (sublayer 5a, 5b or 5c formed by the bead). As a result, the oxides can be prevented from remaining between the preceding bead B1 and the next bead B2, and cracks due to the oxides can be prevented from occurring in the LMD layer 5.

When the second and third LMD sublayers 5b and 5c are formed, laser light having a high energy density for melting the copper material is not necessary. Accordingly, when the second and third LMD sublayers 5b and 5c are formed, an energy density of the laser light can be made lower than that in the case where the first LMD sublayer 5a is formed.

The present invention is not limited to the above-described embodiment, and needless to say, various modifications can be made within the scope of the technical idea of the present invention.

REFERENCE SIGNS LIST

3 Heat transfer body
3a Outer circumferential surface
3b Inner circumferential surface
5 LMD layer
5a First LMD sublayer
5b Second LMD sublayer
5c Third LMD sublayer
7 Inner space
7a Combustion chamber
7b Nozzle flow path
9 Flow path
10 Heat exchanger
10a Combustor
10b Nozzle
11 LMD device
13 Holding device
B Bead
B1 Preceding bead
B2 Next bead
C Axis

The invention claimed is:

1. A method for manufacturing a heat exchanger for cooling heat from a higher-temperature fluid, with a lower-temperature fluid whose temperature is lower than that of the higher-temperature fluid, the method comprising:
 (A) preparing a heat transfer body that forms an inner space where one of the higher-temperature fluid and the lower-temperature fluid is to exist, wherein the heat transfer body is a constituent element of the heat exchanger and is formed, as a wall surrounding the inner space, of a material including pure copper or a copper alloy, and in the wall, a flow path through which the other of the higher-temperature fluid and the lower-temperature fluid is made to flow is formed; and
 (B) forming an LMD layer directly on an outer circumferential surface of the heat transfer body by laser metal deposition (LMD: laser metal-powder building-up welding) treatment directly on the outer circumferential surface formed of the material including the pure copper or the copper alloy,
 wherein the LMD treatment includes: supplying a metal material to a supply position on the outer circumferential surface of the heat transfer body; and irradiating the supply position with laser light, and thereby, the LMD treatment melts both the metal material and the outer circumferential surface, and forms the LMD layer of the metal material,
 the method performs the LMD treatment at a laser density and material incident energy of levels that cause both the metal material and the outer circumferential surface to be melt and that cause a tensile strength at a bonded portion between the heat transfer body and the LMD layer to become larger than a tensile strength of the heat transfer body itself, and
 the laser density is an energy density of the laser light at the supply position, and the material incident energy is output energy of the laser light per unit mass of the metal material supplied to the supply position per unit time.

2. The method for manufacturing the heat exchanger according to claim 1, wherein the metal material is a nickel-based alloy, the laser density is equal to or larger than 490 W/mm$^2$, and the material incident energy is equal to or larger than 420 W/(g/min).

3. The method for manufacturing the heat exchanger according to claim 1,
 wherein the LMD treatment includes: supplying the metal material to the supply position; and irradiating the supply position with laser light while shifting the supply position, and thereby, the LMD treatment forms a bead as a weld metal of the metal material so as to extend along a line in a direction of the shifting, the LMD layer being formed by the bead, and
 the method comprises, at time of forming a next bead so as to be adjacent to an already-formed preceding bead in a direction along the outer circumferential surface, forming the next bead such that the preceding bead is partially covered with the next bead.

4. The method for manufacturing the heat exchanger according to claim 1,
 wherein the LMD treatment includes:
 (B1) supplying the metal material to a supply position on the outer circumferential surface of the heat transfer body and irradiating the supply position with laser light, and thereby melting both the outer circumferential surface and the metal material and forming a first LMD sublayer of the metal material bonded to the outer circumferential surface; and
 (B2) supplying the metal material to a supply position on an outer circumferential surface of the first LMD sublayer and irradiating the supply position with laser light, and thereby melting both the outer circumferential surface and the metal material and forming a second LMD sublayer of the metal material bonded to the outer circumferential surface,
 the LMD layer includes the first and second LMD sublayers,
 at (B1), the LMD treatment irradiates the supply position with the laser light at the energy density, and
 at (B2), the LMD treatment irradiates the supply position with the laser light at an energy density lower than the energy density.

5. The method for manufacturing the heat exchanger according to claim 1,
 wherein the preparing the heat transfer body prepares the heat transfer body that forms the inner space including a combustion chamber of a combustor of a rocket engine.

6. A heat exchanger for cooling heat from a higher-temperature fluid, with a lower-temperature fluid whose temperature is lower than that of the higher-temperature fluid,
- wherein the heat exchanger comprises a heat transfer body that forms an inner space for existence of one of the higher-temperature fluid and the lower-temperature fluid,
- the heat transfer body is formed, as a wall surrounding the inner space, of a material including pure copper or a copper alloy, and in the wall, a flow path through which the other of the higher-temperature fluid and the lower-temperature fluid is made to flow is formed, and
- the heat exchanger comprises a laser metal deposition (LMD: laser metal-powder building-up welding) layer formed directly on an outer circumferential surface of the heat transfer body, the outer circumferential surface being formed of the material including the pure copper or the copper alloy,
- the LMD layer includes a portion mixed with the material including the pure copper or the copper alloy of the outer circumferential surface, and
- a tensile strength at a bonded portion between the heat transfer body and the LMD layer is larger than a tensile strength of the heat transfer body itself.

7. The heat exchanger according to claim 6,
- wherein the heat exchanger forms a combustor of a rocket engine, and the inner space includes a combustion chamber of the combustor.

\* \* \* \* \*